US009585124B2

(12) United States Patent
Diener et al.

(10) Patent No.: US 9,585,124 B2
(45) Date of Patent: Feb. 28, 2017

(54) UPLINK-BASED WIRELESS RADIO RESOURCE MANAGEMENT

(71) Applicant: Cisco Technology, Inc., San Jose, CA (US)

(72) Inventors: Neil R. Diener, Hudson, OH (US); Pooya Monajemi, Palo Alto, CA (US); Jim Florwick, Frederick, MD (US); Jyoti Raju, San Jose, CA (US); John Matthew Swartz, Lithia, FL (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 14/088,483

(22) Filed: Nov. 25, 2013

(65) Prior Publication Data

US 2015/0146543 A1    May 28, 2015

(51) Int. Cl.
| | |
|---|---|
| *H04W 72/08* | (2009.01) |
| *H04W 72/04* | (2009.01) |
| *H04W 52/24* | (2009.01) |
| *H04W 52/40* | (2009.01) |
| *H04B 17/318* | (2015.01) |

(52) U.S. Cl.
CPC .......... *H04W 72/04* (2013.01); *H04B 17/318* (2015.01); *H04W 52/24* (2013.01); *H04W 52/40* (2013.01); *H04W 52/242* (2013.01); *H04W 52/245* (2013.01)

(58) Field of Classification Search
CPC  H04W 72/08; H04W 72/0413; H04W 52/242
USPC ......................................... 370/248
See application file for complete search history.

(56) References Cited

U.S. PATENT DOCUMENTS

| | | | |
|---|---|---|---|
| 8,334,752 B2 | 12/2012 | Kukita et al. | |
| 2005/0063356 A1* | 3/2005 | Larsen ................. | H04L 43/08 370/351 |
| 2008/0233948 A1* | 9/2008 | Kazmi ............... | H04W 72/082 455/423 |

(Continued)

OTHER PUBLICATIONS

Li, et al., "An RFID Location Model Based on Virtual Reference Tag Space," Journal of Computational Information Systems 7, Available at http://www.Jofcis.com, Jun. 2011, pp. 2104-2111.

(Continued)

*Primary Examiner* — Andrew Chriss
*Assistant Examiner* — Voster Preval
(74) *Attorney, Agent, or Firm* — Edell, Shapiro & Finnan, LLC (57) ABSTRACT

Presented herein are techniques for using uplink transmissions from devices (e.g., wireless tags, clients, etc.) to determine a path loss between neighboring access points. In one example, a wireless controller obtains receive signal strength information of uplink transmissions received at neighboring access points in a wireless network. The wireless controller determines an effective path loss between the neighboring access points based on the receive signal strength information for the uplink transmissions received at the neighboring access points. The wireless controller also performs radio resource management operations in the wireless network using the effective path loss determined based on the uplink transmissions received at the neighboring access points.

21 Claims, 4 Drawing Sheets

(56) References Cited

U.S. PATENT DOCUMENTS

| | | | | |
|---|---|---|---|---|
| 2010/0109849 A1* | 5/2010 | Wang | ........................ | G01S 5/18 |
| | | | | 340/10.5 |
| 2011/0171992 A1* | 7/2011 | Seo | ....................... | H04W 52/10 |
| | | | | 455/522 |
| 2013/0102248 A1 | 4/2013 | Jay et al. | | |
| 2013/0196606 A1* | 8/2013 | Brown | ................ | H04W 52/367 |
| | | | | 455/73 |
| 2014/0105118 A1* | 4/2014 | Senarath | ........... | H04W 72/1231 |
| | | | | 370/329 |
| 2014/0192673 A1* | 7/2014 | Li | ......................... | H04B 7/024 |
| | | | | 370/252 |
| 2014/0329554 A1* | 11/2014 | Froberg Olsson | .. | H04W 52/244 |
| | | | | 455/522 |
| 2015/0078161 A1* | 3/2015 | Elsherif et al. | ............... | 370/235 |

OTHER PUBLICATIONS

Viswanathan, "Adaptive Transmit Power Control based on Signal Strength and Frame Loss Measurements for WLANs," A thesis submitted to the Graduate School—New Brunswick, Rutgers, The State University of New Jersey in partial fulfillment of the requirements for the degree of Master of Science Graduate Program in Electrical and Computer Engineering, New Brunswick, New Jersey, Oct. 2009, 58 pages.

\* cited by examiner

UPLINK-BASED WIRELESS RADIO RESOURCE MANAGEMENT

TECHNICAL FIELD

The present disclosure relates to radio resource management in wireless networks.

BACKGROUND

Wireless (e.g., Wi-Fi™) networks are local area communication networks that enable electronic devices to wirelessly exchange data or to wirelessly connect to network resources, such as the Internet. Wireless networks are becoming increasingly popular and are installed in a large number of homes, offices, public locations, etc. In a typical wireless network, one or more access points are present. Access points are devices that include a radio transmitter/receiver (transceiver) that is used to bridge the wireless and wired (e.g., Ethernet) network communication media.

In certain circumstances, wireless connectivity may be available to a large number of electronic devices (clients) within a certain area. Such environments, sometimes referred to as high-density wireless environments, may include, for example, stadiums, movie theaters, malls, convention centers, or other locations. In a high-density wireless environment, the wireless network may include numerous access points deployed in a relatively small area (in comparison to traditional home or enterprise wireless deployments) in order to support a high density of clients.

DESCRIPTION OF EXAMPLE EMBODIMENTS

Overview

Presented herein are techniques for using uplink transmissions from devices (e.g., wireless transmitter "tags," clients, etc.) to determine an "effective" path loss between neighboring access points. In one example, a wireless controller obtains receive signal strength information of uplink transmissions received from a same device at neighboring access points. The wireless controller determines an effective path loss between the neighboring access points based on the receive signal strength information for the uplink transmissions received at the neighboring access points from the device. The wireless controller may perform Radio Resource Management operations in the wireless network using the effective path loss determined based on the uplink transmissions received at the neighboring access points.

Example Embodiments

Radio Resource Management (RRM) is used in high-density wireless networks to perform dynamic channel assignment (DCA) and transmit power control (TPC) operations. In traditional arrangements, Radio Resource Management relies on over-the-air messages exchanged between access points to determine the relative Radio Frequency (RF) proximity of neighboring access points. The messages exchanged between access points are sometimes referred to as neighbor messages and may be neighbor discovery protocol (NDP) packets. Current Radio Resource Management operations operate solely on neighbor messages and do not rely on any information received from clients or other entities within the wireless network to determine the RF proximity (path loss) between access points. That is, only neighbor information, including NDP packets and access point-to-access point Received Signal Strength Indication (RSSI) values, have heretofore been used to determine neighbor RF proximity.

The performance of conventional Radio Resource Management operations is acceptable in most scenarios. However, in certain high-density wireless networks the access points may include directional antennas that are used to constrain the coverage area of the respective access points. Although these directional antennas may help minimize co-channel interference between neighboring access points, the use of directional antennas can also distort the neighbor messages, and thus distort an access point's RF proximity determination. That is, the directional nature of the antennas may make it difficult for neighboring access points to determine their relative RF proximity to one another using only the neighbor messages (as required by current arrangements). Since RF proximity (path loss) is used an input to the Radio Resource Management operations, the lack of accurate RF proximity determinations also affects the operation of the wireless network (e.g., improper channel assignment, incorrect transmit power control, etc.). For example, in certain scenarios, the access point-to-access point RF proximity may be measured as close to zero, while clients observing both access points may suffer from interference problems from simultaneous transmissions from those access points.

As such, presented herein are techniques that use uplink information to calculate an effective path loss (i.e., determine the effective RF proximity) between neighboring access points, rather than relying solely on neighbor information. Uplink information includes packets/signals transmitted to the access points from other devices/entities (i.e., non-access point devices) in the wireless network. In general, the techniques presented herein adjust/enhance the access point-to-access point RF proximity determination (e.g., access point-to-access point RSSI values) based on uplink transmissions received at the access points from the other entities in the wireless network. As described below, the uplink transmissions may be generated by clients operating in the wireless network, by wireless transmitter "tags" within the wireless network, etc. These techniques do not require the prior knowledge of the utilized antennas (i.e., no input information on antenna direction and gain is needed).

The use of uplink information (derived from wireless tag uplink transmissions and/or client uplink transmissions) along with the enhancements to the Radio Resource Management operations improve wireless network operation in high-density environments. The techniques allow Radio Resource Management to run dynamically, and respond to changing conditions in the high-density environments, thereby eliminating the conventional labor-intensive manual tuning of Radio Resource Management parameters used in conventional high-density environments.

Figure 1:
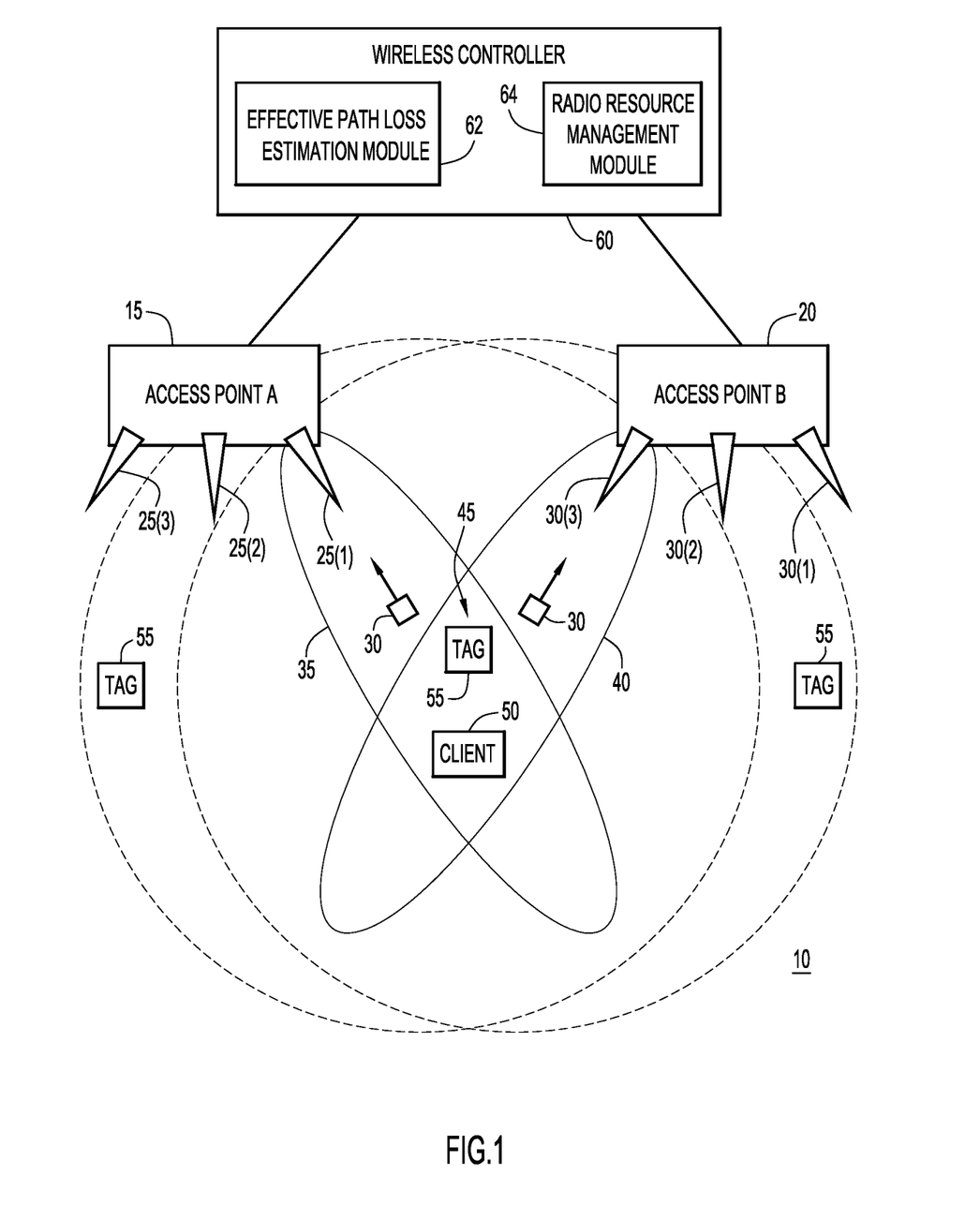
FIG. 1 is a block diagram of a wireless network configured to implement uplink-based radio resource management operations in accordance with examples presented herein.

FIG. 1 is a diagram illustrating a simplified portion of a high-density wireless network 10, in which the uplink-based radio resource management techniques presented herein may be employed. The wireless network 10 may include a plurality of access points that provide wireless connectivity to various electronic devices (clients) present in the vicinity of a location (e.g., office, stadium, etc.). For ease of illustration, only two access points 15 and 20 are shown in FIG. 1. Access point 15 is referred to herein as "access point A," while access point 20 is referred to herein as "access point B." Also merely for ease of illustration, the wireless network 10 is described as servicing a stadium venue. It is to be appreciated that embodiments presented herein may be used in other wireless networks that provide wireless connectivity to other sites, venues, etc.

Also shown in FIG. 1 is a wireless controller 60. The wireless controller 60 is a centralized device configured to manage the access points in wireless network 10. To this end, wireless controller 60 includes an effective path loss estimation module 62 and a Radio Resource Management module 64. Further details of the effective path loss estimation module 62 and the Radio Resource Management module 64 are provided below. FIG. 1 shows that the wireless controller 60 is connected to the access points 15 and 20, but it should be understood that this connection is typically made by way of a local area (or wide area) wired network. For simplicity, the intervening wired network is not shown in FIG. 1.

Access point 15 comprises antennas 25(1)-25(3), while access point 20 comprises antennas 30(1)-30(3). Antenna 25(1) of access point 15 is a directional antenna capable of producing an antenna beam 35. Antenna 30(3) of access point 20 is also a directional antenna capable or producing an antenna beam 40. The antenna beams 35 and 40 overlap with one another at a region 45 and a client 50, referred to as client C, is positioned at (within) region 45. Also positioned at region 45 is a wireless transmitter tag 55, also referred to herein as a sentinel tag.

In the arrangement of FIG. 1, because of the use of directional antennas 25(1) and 30(3), neighbor messages transmitted between the two access points 15 and 20 will be received with a path loss (PL) incorrectly indicating that the access points 15 and 20 are further apart (in terms of RF proximity) then they actually are. In other words, the RF proximity of access point 15 to access point 20, as indicated by the neighbor messages, may be incorrect and different from the actual RF proximity of access point 15 to access point 20 as observed by client 50 in region 45. Thus, the Radio Resource Management operations will not have an accurate determination of the true RF proximity between the access points from the perspective of client 50. As a result, the Radio Resource Management operations may be performed incorrectly.

In order to solve this problem, the wireless controller 60 is configured to use uplink information to estimate/determine the RF proximity between the access points 15 and 20. The RF proximity determined using the uplink information may then be used in subsequent Radio Resource Management operations. The uplink information may be derived from packets/signals transmitted by a wireless tag 55 and/or a client 50 to both of the access points 15 and 20.

As noted above, in the example of FIG. 1, a wireless tag 55 is positioned within region 45. The wireless tag 55 is a small wireless device that is configured to periodically wirelessly transmit packets over the wireless network 10. That is, the tag 55 has a wireless radio and is configured to transmit a payload on a set of one or more channels every N seconds, minutes, etc. The tag 55 may have a dual-band wireless radio so as to be capable of transmitting packets in both the 2.4 GHz and the 5 GHz band. The transmit power of the wireless tag 55 is configured and may be known by the wireless controller 60 or alternatively may be transmitted as part of the data that is transmitted over-the-air (OTA) by the tag. In certain embodiments, the tag 55 is a battery powered device. The tag 55 may not be able to receive communications (i.e., may only be a transmitting device).

In operation, a plurality of tags 55 may be deployed in the wireless network 10, as shown in FIG. 1. More specifically, tags 55 may be placed at selected locations in the stadium (i.e., the site serviced by the wireless network 10). For example, tags 55 may be placed at the center and four corners of each section of seats in the stadium.

In accordance with one example arrangement of FIG. 1, the tag 55 positioned in region 45 transmits packets (shown graphically at reference numeral 70) that are received at each of the access points 15 and 20. After the access points 15 and 20 receive the packets 70, the effective path loss estimation module 62 identifies the power at which the tag 55 transmits the packets 70 (as a predetermined/known value or by extracting the value from the payload of the packets 70 themselves) and determines the power (receive signal strength) at which the packets 70 are received at each of the access points 15 and 20. In this way, the effective path loss estimation module 62 of the wireless controller 60 determines the path loss of the packet as it traveled from the tag 55 to each access point 15 and 20, and thus the effective path estimation module 62 determines the path loss between the respective access point and the tag 55.

Due to the reciprocal nature of a wireless channel (i.e., transmission and reception of packets occur on the same frequency using the same antennas), the path loss between an access point 15 and the tag 55 (and access point 20 and the tag 55), determined based on the reception of the packets 70, can be used to derive downlink path loss information from the access point to a particular location in the network where the uplink transmission was received (e.g., the location of the tag 55). In particular, the uplink RF proximity (path loss) is equal to the downlink RF proximity (path loss) such that the effective path loss estimation module 62 can also determine the path loss in the downlink direction. Stated differently, the reciprocal nature of the wireless channel means that the received packets 70 can provide an indication of the power (strength) at which a client 50 receives packets from the access points 15 and 20. If the access points 15 and 20 transmit at that power, by the reciprocal property of the channel, the power level (receive signal strength) at which the access points receive the packets 70 is same as the signal strength level at which the client 50 within region 45 would receive transmissions from the access points.

It may be assumed that there is a one to one relationship between path loss and RSSI when the transmit power of the source is known. This relationship can be described by a function $f$ shown below as:

$$RSSI(AB) = f(PL(AB))$$

$$PL(AB) = f^{-1}(RSSI(AB))$$

In the case of two neighboring access points A and B having omnidirectional antennas, the path loss follows a distance-based model (e.g., the free space model) where smaller path loss values are indicative of shorter distances between the access points and larger path loss values are indicative of greater distances between access points A and B. In such scenarios, a client C near access points A and B may experience path loss values from access points A and B that will be larger or equal in sum to the path loss experienced between access points A and B. This is shown below as:

$$PL(AC)+PL(BC) \geq PL(AB)$$

However, in a wireless network that uses directional antennas, such as wireless network 10, the path loss values are not simple functions of distance. As noted, the access point-to-access point RSSI (measured via neighbor messages) can be minimal compared to the free space (omnidirectional) model. As such, client C in FIG. 1 can see both access point A and access point B, but the access points A and B do not have awareness of each other or see each other at much smaller RSSIs compared to those measured at client C. In such cases:

$$PL(AC)+PL(AC) < PL(AB)$$

In accordance with examples presented herein, the measured AB RSSI values (i.e., the RSSI value between access point A and access point B) is converted into an omnidirectional scenario wherein the client C lies in the middle of the two access points A and B. This is represented mathematically as:

$$RSSI(AB) \equiv f(PL(AC)+PL(BC)) = f(f^{-1}(RSSI(AC))+f^{-1}(RSSI(BC)))$$

The adjusted RSSI, referred to as the effective path loss between access points A and B, is then input to the Radio Resource Management operations to replace the (incorrect) measured access point-to-access point RSSI. Assuming no information available about other possible locations, it is assumed that client C is located where PL(AC)+PL(BC) is smallest, therefore making the minimum required adjustment on the access point-to-access point RSSI.

Figure 2A:
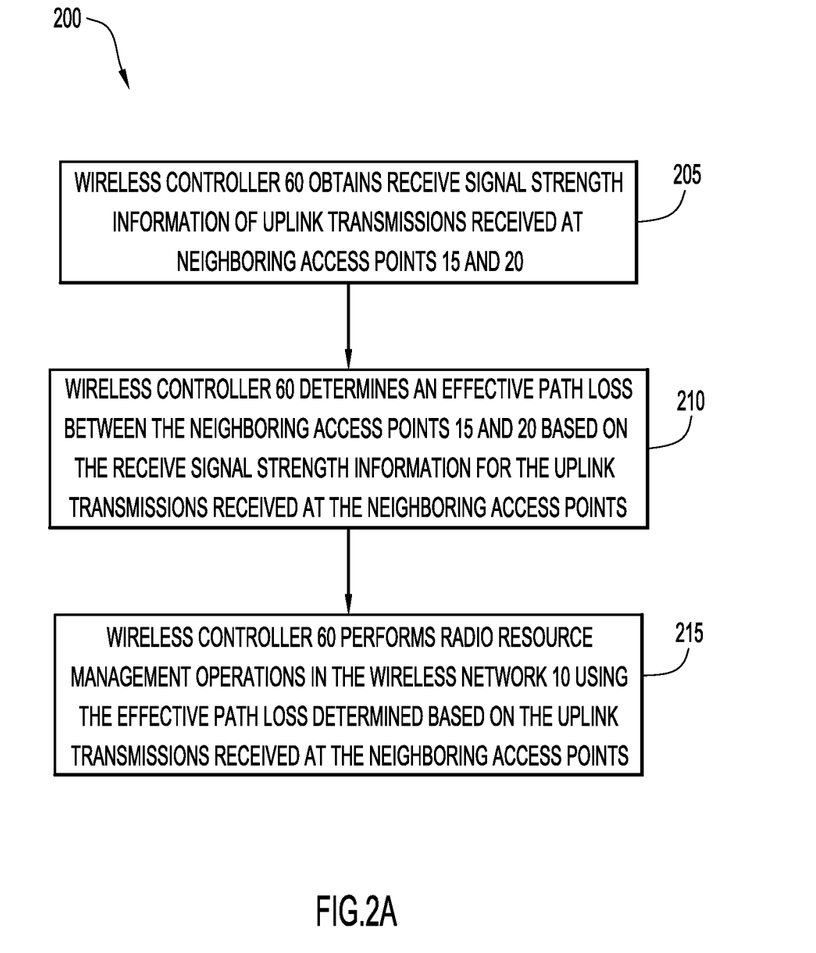
FIG. 2A is a flowchart of uplink-based radio resource management operations in accordance with examples presented herein.

FIG. 2A is a flowchart of a method 200 in accordance with examples presented herein. Continued reference is made to FIG. 1 for purposes of the description of FIG. 2. Method 200 begins at 205 where wireless controller 60 obtains receive signal strength information of uplink transmissions received at each of the neighboring access points 15 and 20 from the same one or more devices (e.g., tags, clients, etc.) For example, access points 15 and 20 each receive uplink transmissions from the same one or more devices and each make RSSI measurements of those received uplink transmissions. The access points 15 and 20 send those RSSI measurements to the wireless controller 60. As noted elsewhere herein, the uplink transmissions may be transmitted by wireless transmitter tags 55, clients 50, or other non-access point entities in wireless network 10.

At 210, the wireless controller 60 determines an effective path loss between the neighboring access points 15 and 20 based on the receive signal strength information for the uplink transmissions received at the neighboring access points from the same one or more devices. At 215, the wireless controller 60 performs Radio Resource Management operations in the wireless network 10 using the effective path loss determined based on the uplink transmissions received at the neighboring access points.

Figure 2B:
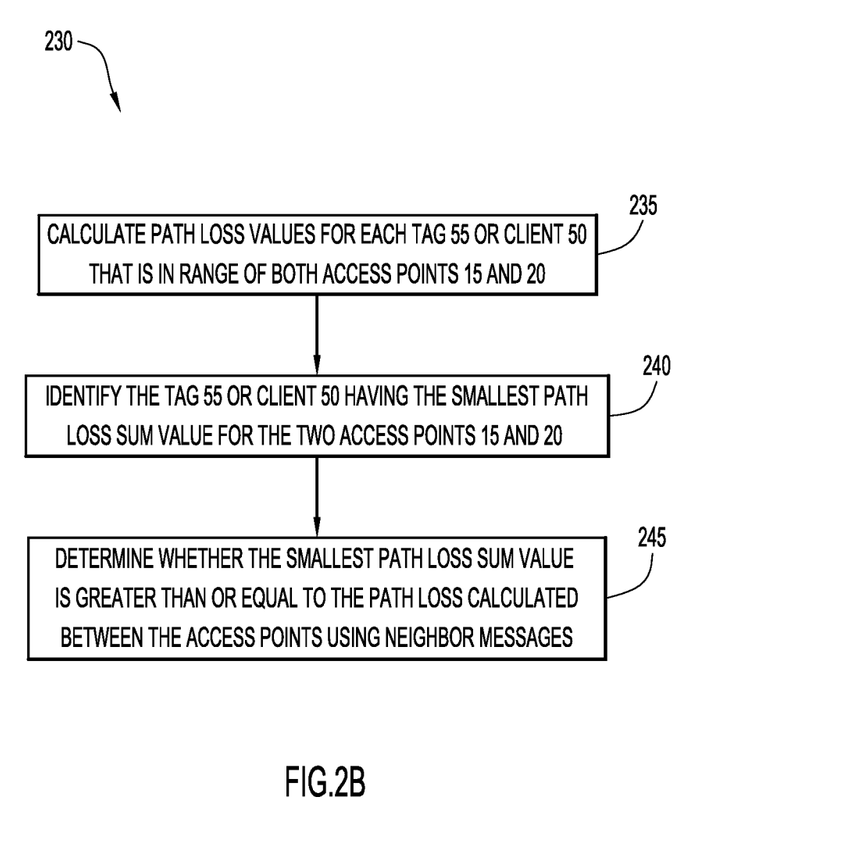
FIG. 2B is a flowchart of a method for determining effective path loss between neighboring access points in accordance with examples presented herein.

FIG. 2B is a flowchart illustrating one method 230 for determining effective path loss between the neighboring access points 15 and 20 based on the receive signal strength information for the uplink transmissions received at the neighboring access points from the same one or more devices (i.e., the operations performed at 210 of FIG. 2A). The method 230 begins 235 where path loss values are calculated for each tag 55 or client 50 that is in range of (in proximity to) both access points 15 and 20 (e.g., using the RSSI measurements obtained from the access points 15). At 240, the tag 55 or client 50 having the smallest sum of path loss values between the two access points 15 and 20 is identified as:

$$\hat{i} = \text{arg } i \text{ min}(PL(AC_i)+PL(BC_i))$$

where arg i min represents a minimization function to produce the smallest path loss ($\hat{i}$) from a subset of tags/clients ($C_i$) in proximity to neighboring access points A and B.

In other words, at 240 a "path loss sum value" is calculated for each of the plurality of the tags/clients (devices) in proximity to the neighboring access points. The path loss sum value for each device is the sum or total of the path loss between the device and the first access point (access point A) with the path loss between the device and the second neighboring access point (access point B). The device having the smallest path loss sum value is then identified.

At 245, a determination is made as to whether the determined smallest sum of path loss values (i.e., smallest path loss sum value) is greater than or equal to the path loss calculated between the access points using neighbor messages. This condition is given as:

$$PL(AC_i)+PL(BC_i) \geq PL(AB)$$

When the above condition is true, that is when the smallest path loss sum value is greater than or equal to the path loss calculated between the access points using neighbor messages, then the path loss calculated using the neighbor messages is the effective path loss used for subsequent Radio Resource Management operations. However, when the above condition is not true, that is when the smallest path loss sum value is not greater than or equal to the path loss calculated between the access points using neighbor messages, then the effective path loss used for subsequent Radio Resource Management operations is given as:

$$RSSI_{adj}(AB) = f(PL(AC)+PL(BC))$$

As noted, a path loss sum value may be calculated for each of the plurality of the tags/clients (devices) in proximity to the neighboring access points. A tag/client may be in proximity to the neighboring access points when the tag/client is which the cross-coverage area of the neighboring access points. The cross-coverage area of neighboring access points refers to an area where clients would hear both access points above a certain power threshold. In certain examples, the wireless controller 60 determines the cross-coverage area between the two access points 15 and 20. To determine the cross-coverage area, one or more tags (or clients) for which the uplink RSSI values at both access points are larger than a threshold T1 are identified. The threshold T1 is set in order to take into account the transmit power of the tags and a target minimum RSSI value. The target minimum RSSI value may be determined, for example, in the design phase of the wireless network. The cross-coverage area may be classified as minor or major (e.g., one tag versus several tags in a set).

In certain examples, the RSSI measurements from tags/clients may be used to set a minimum level to the transmit power of access points 15 and 20 (i.e., a minimum downlink power). In such examples, the tags/clients positioned in the cross-coverage area of access points 15 and 20 are identified. The RSSI measurements from those tags/clients within the cross-coverage area evaluated and used to select the minimum transmit power for the access points 15 and 20. In particular, the minimum transmit power for the access points 15 and 20 is selected such that substantially all or a majority of clients (or clients located where the tags are located) would receive downlink transmissions from the access points 15 and 20. In other words, a lower bound is set for the transmit power of the access points 15 and 20 such that a client's maximum received RSSI (from the access point or another) does not fall below a predetermined threshold.

In accordance with certain examples presented herein, for a first access point (AP_i), the tags/clients with the smallest path-loss among all access points with AP_i (denoted as set S_i for AP_i) is/are identified. While assigning the transmit power of an AP_i, a lower bound is applied on the power such that all the tags in the set S_i of the AP_i would receive frames from AP_i with a power level above RX_SOP. To do so, the transmit power determination takes into account the power level of the tag and the previously calculated path-loss between AP_i and the tag.

In accordance with other examples presented herein, it may be advantageous to evaluate the two-dimensional (2D) coverage and access point-to-access point cross-coverage areas for a given layout of access points and a given power/channelization scheme. When computing cross-coverage areas in cases where two access points show large path loss while a tag shows a small path loss to each, this computation can be performed in the following two manners.

First, without assumption of uniformity in tag location distribution and with no knowledge about antenna patterns, it is assumed that the two access points and the tag lie on a straight line. Next, the access point to tag distance is computed to provide the measured access point to tag path loss using the appropriate path loss model. The two access point to tag distances are summed to find access point-to-access point distance. Using the target RSSI for coverage, the cross coverage area between the two access points is determined. This method provides the smallest cross coverage area by assuming the access points lie on a straight line with the tag.

Alternatively, without assumption of uniformity in tag location distribution, and with large sample size in tags, a tag density (or a user input) may be computed by dividing a single access point's coverage area by the number of tags visible to the access point. Next, the cross-coverage areas are determined by applying the same density to the number of tags that are visible to two access points.

The use of uplink information from tags 55 can provide several advantages. For example, the RSSI associated with received transmissions from the tags and the number of tags for which received transmissions have an RSSI larger than a threshold for a given access point can be used as a metric of the health of the wireless network for diagnostic purposes. Also, if the position of the tags is known (which is quite likely since they are positioned by a network administrator), further benefits can be achieved. In this case, the RSSI of the tags (corrected by their transmit power, and access point maximum transmit power) provides a continuous measured heat-map (as opposed to a predicted/modeled heat-map). This type of continuous measured heat-map can be used as data to improve location accuracy, or to further refine Radio Resource Management operations.

As noted above, FIGS. 1, 2A, and 2B have primarily been described with respect to the uplink transmissions being generated by wireless tags. It is to be appreciated that the uplink transmissions may additionally or alternatively be generated by client devices. For example, one option would be to use beacon reports or uplink Probe Request packets transmitted by clients. When a client sends a probe request across several RF channels, many access points hear the probe request on their active channel. Another option is to use client data transmissions as the uplink information.

As in the case of wireless tags, the uplink transmissions from clients can be used to infer an overlap in coverage. When using client probe requests, it may be necessary to ensure that multiple access points are comparing the RSSI of received probe packets transmitted when the client is stationary. This can be accomplished in several ways. First, the access points can be time synchronized and the time of the reception of the probe packets at the access points can be evaluated to ensure they were sent at the same time, and thus when the client was in the same location. For example, only received probe packets that were received within a predetermined number of seconds would be considered sent by the client when it was stationary at one location. Alternatively, sequence numbers in the probe packets can be used to recognize when the same probe packet is received by multiple access points. As a yet further extension, client data packets could also be used, although they may be received on a smaller number of access points operating on the same channel.

Figure 3:
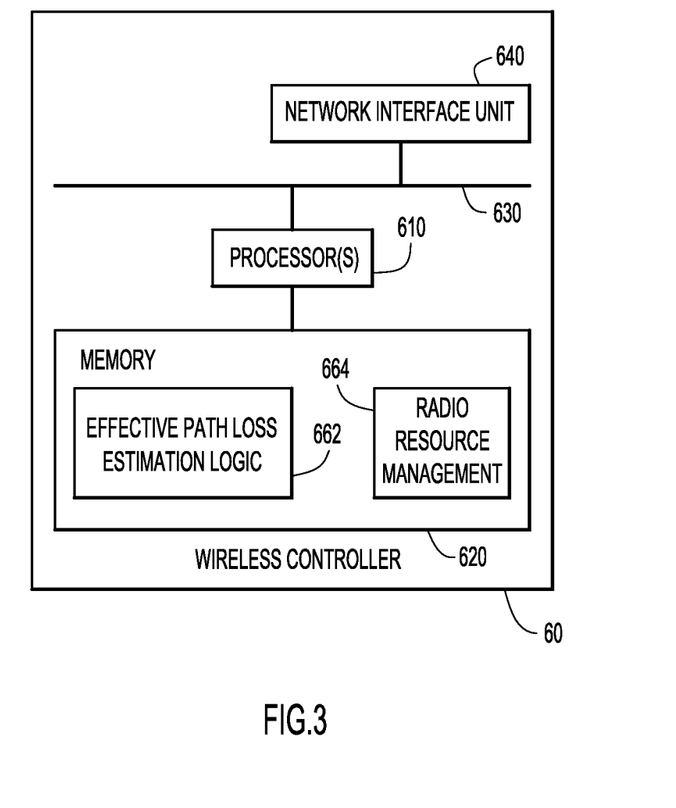
FIG. 3 is a block diagram of a wireless controller in accordance with examples presented herein.

FIG. 3 is a block diagram of a wireless controller 60 configured to perform the techniques presented herein. The wireless controller 60 includes one or more processors 610, memory 620, a bus 630 and a network interface unit 640. The processor 610 may be a microprocessor or microcontroller. The network interface unit 640 facilitates network communications between the wireless controller 60 and network nodes (e.g., access points). The processor 610 executes instructions associated with software stored in memory 620. Specifically, the memory 620 stores effective path loss estimation logic 662 that, when executed by the processor 610, performs the operations of the effective path loss estimation module 62 of FIG. 1. The memory 620 also stores Radio Resource Management logic 664 that, when executed by processor 610, performs the operations of the Radio Resource Management module 64 of FIG. 1 (e.g., dynamic channel assignment operations, transmit power control operations, etc.).

The memory 620 may comprise read only memory (ROM), random access memory (RAM), magnetic disk storage media devices, optical storage media devices, flash memory devices, electrical, optical, or other physical/tangible memory storage devices. In general, the memory 620 may comprise one or more tangible (non-transitory) computer readable storage media (e.g., a memory device) encoded with software comprising computer executable instructions and when the software is executed (by the processor 610) it is operable to perform the operations described herein.

The functions of the wireless controller 60 may be virtualized, and for example, performed by an application running in a data center/cloud computing environment.

In summary, a method is provided comprising: obtaining receive signal strength information of uplink transmissions received at neighboring access points in a wireless network; determining an effective path loss between the neighboring access points based on the receive signal strength information for the uplink transmissions received at the neighboring access points; and performing radio resource management operations in the wireless network using the effective path loss determined based on the uplink transmissions received at the neighboring access points.

Similarly, an apparatus is provided comprising a network interface unit configured to enable communications over a network; and a processor coupled to the network interface unit, and configured to: obtain receive signal strength information of uplink transmissions received at neighboring access points in a wireless network; determine an effective path loss between the neighboring access points based on the receive signal strength information for the uplink transmissions received at the neighboring access points; and perform radio resource management operations in the wireless network using the effective path loss determined based on the uplink transmissions received at the neighboring access points.

Further still, one or more computer readable storage media are provided encoded with software comprising computer executable instructions and when the software is executed operable to: obtain receive signal strength information of uplink transmissions received at neighboring access points in a wireless network; determine an effective path loss between the neighboring access points based on the receive signal strength information for the uplink transmissions received at the neighboring access points; and perform radio resource management operations in the wireless network using the effective path loss determined based on the uplink transmissions received at the neighboring access points.

The above description is intended by way of example only. Various modifications and structural changes may be made therein without departing from the scope of the concepts described herein and within the scope and range of equivalents of the claims.

What is claimed is:

1. A method comprising:
   obtaining, at a wireless controller, receive signal strength information of uplink transmissions sent from a first client to first and second neighboring access points in a wireless network, and receive signal strength information of neighbor messages transmitted between the first and second neighboring access points;
   determining, at the wireless controller, an estimated path loss between the first and second neighboring access points using the receive signal strength information obtained from the uplink transmissions sent from the first client to the first and second neighboring access points;
   determining, at the wireless controller, a measured path loss between the neighboring access points using the receive signal strength information obtained from the neighbor messages transmitted between the first and second neighboring access points;
   determining, at the wireless controller, an effective path loss between the first and second neighboring access points based at least on the estimated path loss and the measured path loss; and
   performing, at the wireless controller, radio resource management operations in the wireless network using the effective path loss.

2. The method of claim 1, further comprising:
   determining a path loss for each of a plurality of devices transmitting uplink transmissions to each of the neighboring access points;
   calculating a path loss sum value for each of the plurality of devices, wherein the path loss sum value for each device is a sum of the path loss between a respective device and a first one of the neighboring access points with the path loss between the respective device and a second one of the neighboring access points; and
   identifying a smallest path loss sum value calculated for the plurality of devices transmitting uplink transmissions to each of the neighboring access points.

3. The method of claim 2, further comprising:
   comparing the measured path loss to the smallest path loss sum value.

4. The method of claim 3, wherein if the smallest path loss sum value is greater than or equal to the measured path loss, further comprising:
   using the measured path loss as the effective path loss for subsequent radio resource management operations.

5. The method of claim 3, wherein if the smallest path loss sum value is not greater than or equal to the measured path loss, further comprising:
   using the smallest path loss sum value as the effective path loss for subsequent radio resource management operations.

6. The method of claim 1, wherein determining the estimated path loss comprises:
   determining a cross-coverage area between the neighboring access points using the uplink transmissions received at the access points.

7. The method of claim 1, further comprising:
   receiving the uplink transmissions at the neighboring access points from one or more wireless transmitter tag devices positioned in proximity to the access points in the wireless network.

8. The method of claim 7, wherein determining the effective path loss is further based on known transmit power of the one or more wireless transmitter tag devices.

9. The method of claim 1, further comprising:
   receiving the uplink transmissions at the neighboring access points from one or more client devices operating in the wireless network.

10. The method of claim 1, further comprising:
    using the receive signal strength information of the uplink transmissions received at the neighboring access points to set a lower bound for a transmit power of the neighboring access points.

11. An apparatus comprising:
    a network interface unit configured to enable communications over a network; and
    a processor coupled to the network interface unit, and configured to:
       obtain receive signal strength information of uplink transmissions sent from a first client to first and second neighboring access points in a wireless network and receive signal strength information of neighbor messages transmitted between the first and second neighboring access points;
       determine an estimated path loss between the first and second neighboring access points using the receive signal strength information obtained from the uplink transmissions sent from the first client to the first and second neighboring access points;
       determine a measured path loss between the neighboring access points using the receive signal strength information obtained from the neighbor messages transmitted between the first and second neighboring access points;
       determine an effective path loss between the first and second neighboring access points based at least on the estimated path loss and the measured path loss; and
       perform radio resource management operations in the wireless network using the effective path loss.

12. The apparatus of claim 11, wherein the processor is configured to:

determine a path loss for each of a plurality of devices transmitting uplink transmissions to each of the neighboring access points;

calculate a path loss sum value for each of the plurality of devices, wherein the path loss sum value for each device is a sum of the path loss between a respective device and a first one of the neighboring access points with the path loss between the respective device and a second one of the neighboring access points; and identify a smallest path loss sum value calculated for the plurality of devices transmitting uplink transmissions to each of the neighboring access points.

13. The apparatus of claim 12, wherein the processor is configured to:

compare the measured path loss to the smallest path loss sum value.

14. The apparatus of claim 13, wherein if the smallest path loss sum value is greater than or equal to the measured path loss, the processor is configured to:

use the measured path loss as the effective path loss for subsequent radio resource management operations.

15. The apparatus of claim 13, wherein if the smallest path loss sum value is not greater than or equal to the measured path loss, the processor is configured to:

use the smallest path loss sum value as the effective path loss for subsequent radio resource management operations.

16. One or more non-transitory computer readable storage media encoded with software comprising computer executable instructions and when the software is executed operable to:

obtain, at a wireless controller, receive signal strength information of uplink transmissions sent from a first client to first and second neighboring access points in a wireless network and receive signal strength information of neighbor messages transmitted between the first and second neighboring access points;

determine an estimated path loss between the first and second neighboring access points using the receive signal strength information obtained from the uplink transmissions sent from the first client to the first and second neighboring access points in the wireless network;

determine a measured path loss between the neighboring access points using the receive signal strength information obtained from the neighbor messages transmitted between the first and second neighboring access points;

determine an effective path loss between the first and second neighboring access points based at least on the estimated path loss and the measured path loss; and perform radio resource management operations in the wireless network using the effective path loss.

17. The non-transitory computer readable storage media of claim 16, further comprising instructions operable to:

determine a path loss for each of a plurality of devices transmitting uplink transmissions to each of the neighboring access points;

calculate a path loss sum value for each of the plurality of devices, wherein the path loss sum value for each device is a sum of the path loss between a respective device and a first one of the neighboring access points with the path loss between the respective device and a second one of the neighboring access points; and identify a smallest path loss sum value calculated for the plurality of devices transmitting uplink transmissions to each of the neighboring access points.

18. The non-transitory computer readable storage media of claim 17, further comprising instructions operable to:

compare the measured path loss to the smallest path loss sum value.

19. The non-transitory computer readable storage media of claim 18, wherein if the smallest path loss sum value is greater than or equal to the measured path loss, further comprising instructions operable to:

use the measured path loss as the effective path loss for subsequent radio resource management operations.

20. The non-transitory computer readable storage media of claim 18, wherein if the smallest path loss sum is not greater than or equal to the measured path loss, further comprising instructions operable to:

use the smallest path loss sum value as the effective path loss for subsequent radio resource management operations.

21. The method of claim 1, wherein the uplink transmissions sent from the first client to the first and second neighboring access points in a wireless network comprise at least one of beacon reports, uplink probe request packets, or client data transmissions.

* * * * *